F. VILLARD.
Air Cooling Ventilator.
No. 55,180.
Patented May 29, 1866.
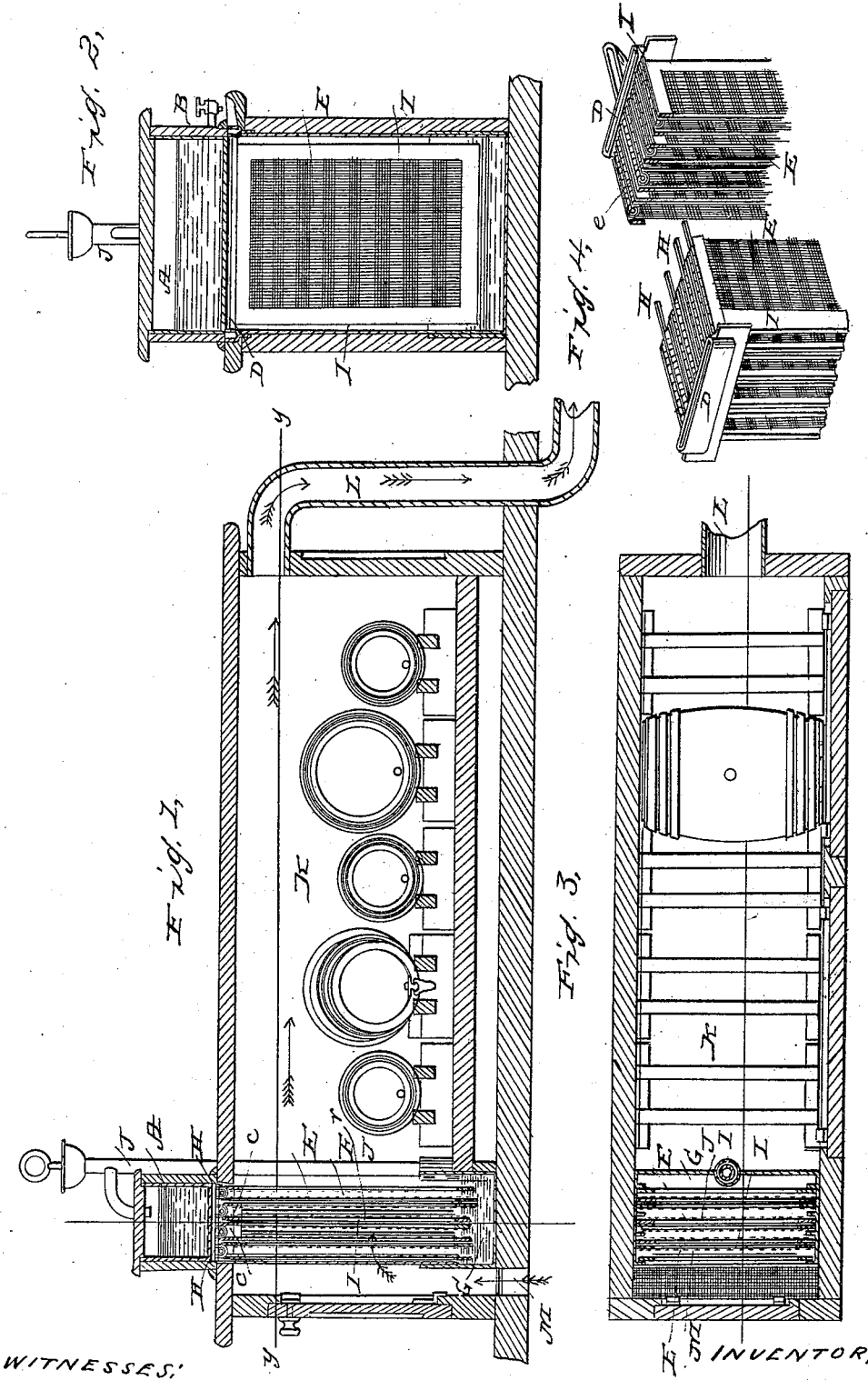

UNITED STATES PATENT OFFICE.

FRIEDRICH VILLARD, OF MOUNT EATON, OHIO.

AIR-COOLING VENTILATOR.

Specification forming part of Letters Patent No. 55,180, dated May 29, 1866.

*To all whom it may concern:*

Be it known that I, FRIEDRICH VILLARD, of Mount Eaton, in the county of Wayne and State of Ohio, have invented an Improved Air-Cooling Ventilator; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a vertical longitudinal section, illustrating my invention as applied to a beer-counter. Fig. 2 is a transverse section at $x\ x$, Fig. 1. Fig. 3 is a horizontal section at $y\ y$, Fig. 1. Fig. 4 is a perspective view of the water grate and conductor, hereinafter described.

Similar letters of reference represent corresponding parts in the several figures.

My invention consists in apparatus by which air is first cooled by contact with conductors kept constantly saturated with water, and then passed through a close chamber containing anything which it is desirable to cool or preserve.

To enable others skilled in the art to which my invention appertains to construct and use the same, I will proceed to describe it in detail.

In the accompanying drawings, A represents a water-tank, provided near its bottom with a faucet, B, through which water is allowed to flow at any desired speed onto a water-grate of peculiar construction, consisting of a series of shallow troughs, C C C C, connected at their ends by transverse troughs D D.

E E represent conductors of any suitable fibrous or perforated material, dipping at their upper ends into the troughs C and extending downward to the bottom of the air-cooling chamber, F, where their lower ends may be immersed in the receiving-tank G. In the present illustration the said conductors are made in pairs, consisting of cloths held with their central parts within the troughs C by rods H, and extending downward on both sides, where they are attached to frames I I, to cause them to extend across and occupy the entire width of the air-cooling chamber.

J represents a pump by which the water is returned from the lower tank, G, to the upper tank, A.

K represents a close chamber or receptacle for containing food, drink, or any other article it is desired to cool or preserve.

L represents a chimney connecting with the chamber K, and serving to produce a continuous draft or current of air through the latter.

The air entering at M is compelled either to pass through the water-conductors E or to circulate around the successive sheets, and is, in either case, brought into contact with a large extent of moistened surface, the rapid evaporation from which is very effective in cooling the air. By this means the interior of the receptacle may be kept constantly at a temperature less than 40° Fahrenheit in the hottest weather. Hence the apparatus is of great value for cooling or preserving milk, beer, liquors, meat, butter, fruit, and provisions in general.

The tank A may be supplied either by hand or from an elevated reservoir or other source.

If desired, the cooling-chambers may be arranged in tiers one above another, so that the water in passing down will flow over the successive conductors.

The apparatus may also be used with good effect for cooling wort or mash in breweries.

The aperture M, at which the air enters, is covered with wire-gauze to exclude insects or foreign matter.

Having thus described my invention, the following is what I claim as new and desire to secure by Letters Patent:

1. The water-grate C D, constructed substantially as described, for distributing the water over a number of conductors.

2. In combination with the distributing water-grate, constructed and adapted to operate as set forth, the two tanks A G and a water-elevator, J, for passing the water repeatedly over the evaporating surfaces, as explained.

FRIEDRICH VILLARD.

Witnesses:
OCTAVIUS KNIGHT,
ALEX. A. C. KLAUCKE.